(12) United States Patent
Schneider

(10) Patent No.: US 9,742,453 B2
(45) Date of Patent: Aug. 22, 2017

(54) RECEIVING ARRANGEMENT OF A MOTOR VEHICLE

(71) Applicant: Bayerische Motoren Werke Aktiengesellschaft, Munich (DE)

(72) Inventor: Steffen Schneider, Bergen (DE)

(73) Assignee: Bayercische Motoren Werke Aktiengesellschaft, Munich (DE)

(*) Notice: Subject to any disclaimer, the term of this patent is extended or adjusted under 35 U.S.C. 154(b) by 498 days.

(21) Appl. No.: 13/840,856

(22) Filed: Mar. 15, 2013

(65) Prior Publication Data

US 2013/0223568 A1 Aug. 29, 2013

Related U.S. Application Data

(63) Continuation of application No. PCT/EP2011/066299, filed on Sep. 20, 2011.

(30) Foreign Application Priority Data

Sep. 29, 2010 (DE) .................. 10 2010 041 612

(51) Int. Cl.
*H01Q 1/32* (2006.01)
*H04B 1/18* (2006.01)
(Continued)

(52) U.S. Cl.
CPC ............ *H04B 1/18* (2013.01); *H01Q 1/1271* (2013.01); *H01Q 1/325* (2013.01); *H01Q 1/3275* (2013.01); *H04B 1/082* (2013.01)

(58) Field of Classification Search
CPC .... H01Q 1/1271; H01Q 1/325; H01Q 1/3275; H04B 1/18; H04B 1/082
(Continued)

(56) References Cited

U.S. PATENT DOCUMENTS 4,823,142 A 4/1989 Ohe et al.
4,910,796 A * 3/1990 Nakase et al. ............. 455/197.1
(Continued)

FOREIGN PATENT DOCUMENTS

DE 197 47 961 A1 5/1999
DE 199 58 605 A1 6/2001
(Continued)

OTHER PUBLICATIONS

International Preliminary Report on Patentability (PCT/IB/373), including Written Opinion (PCT/ISA/237) dated Apr. 2, 2013 (seven (7) pages).
(Continued)

*Primary Examiner* — Graham Smith
(74) *Attorney, Agent, or Firm* — Crowell & Moring LLP

(57) ABSTRACT

A receiving arrangement of a motor vehicle has a first antenna array disposed at or on the body of the motor vehicle, and having a second antenna array disposed on a window pane of the motor vehicle. The antenna arrays are coupled to a receiving unit for further processing, in particular, for the demodulation and/or decoding of a respective received signal of the antenna arrays. The receiving unit is directly connected with the first and the second antenna array. The receiving unit, during operation, causes a conversion of a respective received analog signal of the antenna arrays to a respective loss-free transportable digital signal, which the receiving unit provides to a control unit of the receiving unit for further processing.

20 Claims, 2 Drawing Sheets

(51) Int. Cl.
*H01Q 1/12* (2006.01)
*H04B 1/08* (2006.01)

(58) Field of Classification Search
USPC .......................................................... 343/713
See application file for complete search history.

(56) References Cited

U.S. PATENT DOCUMENTS

| | | |
|---|---|---|
| 5,177,494 A | 1/1993 | Doerrie et al. |
| 5,248,985 A | 9/1993 | Haemmerle |
| 6,351,242 B1 | 2/2002 | Hesker |
| 7,542,750 B2 * | 6/2009 | Zahm .......................... 455/277.2 |
| 2008/0026705 A1 | 1/2008 | Asami |

FOREIGN PATENT DOCUMENTS

| | | |
|---|---|---|
| DE | 10 2005 009 443 A1 | 9/2006 |
| EP | 0 544 937 A1 | 6/1993 |
| EP | 0 994 525 A2 | 4/2000 |
| EP | 1 953 923 A1 | 8/2008 |
| EP | 2 211 485 A1 | 7/2010 |

OTHER PUBLICATIONS

International Search Report, including English translation dated Nov. 22, 2011 (six (6) pages).
German Search Report, including English translation dated Jun. 9, 2011 (ten (10) pages).

\* cited by examiner

RECEIVING ARRANGEMENT OF A MOTOR VEHICLE

CROSS REFERENCE TO RELATED APPLICATIONS

This application is a continuation of PCT International Application No. PCT/EP2011/066299, filed Sep. 20, 2011, which claims priority under 35 U.S.C. §119 from German Patent Application No. 10 2010 041 612.6, filed Sep. 29, 2010, the entire disclosures of which are herein expressly incorporated by reference.

BACKGROUND AND SUMMARY OF THE INVENTION

The invention relates to a receiving arrangement of a motor vehicle having a first antenna array disposed at or on the body of the motor vehicle, and having a second antenna array disposed on a window pane of the motor vehicle. The antenna arrays are coupled to a joint receiving unit for the further processing of the received signals, in particular, for their demodulation and/or decoding.

In the case of current receiving arrangements of the above-mentioned type, respective antenna amplifiers are assigned to the first antenna array and to the second antenna array. The amplifiers are arranged together with the assigned antenna in a respective antenna array. For reasons of cost, a joint receiver or several receivers in an array or in a housing are assigned to both antennas or both antenna arrays. Together with a CD-drive, an optional navigation system and additional components, this receiver is arranged in a control unit (a so-called "head unit") of the motor vehicle, which is typically situated in the area of the instrument panel of the motor vehicle (or in another location, for example, in the luggage compartment).

The first antenna array is normally arranged in the shape of a fin with or without a placed rod antenna on the roof of the motor vehicle. The antenna amplifier may be arranged in the fin or on the roof of the vehicle body. The first antenna array frequently includes a plurality of antennas for receiving respective short-wave radio services. In particular, these are the reception of digital audio signals (DAB—Digital Audio Broadcasting), navigation data (GPS—Global Positioning System), telephone, as well as optionally—when a rod antenna is present—analog audio signals in the FM and AM band, for example, for antenna diversity applications.

The second antenna array frequently also includes several antennas for different applications. The antenna or antennas of the second antenna array are usually arranged on the rear window and/or a side window of the motor vehicle. They are provided for the reception of long-wave radio services, particularly therefore for the reception of analog audio signals in the FM and AM band as well as the reception of video data (TV). The antenna amplifier of the second antenna array is normally invisibly accommodated in the area of the window pane or a vehicle body component adjoining the window pane.

The antenna arrays are connected with the spatially remote receiver by way of shielded lines which in some cases have a length of several meters. As a rule, coaxial cables are used for this purpose. A separate shielded line is to be provided for each antenna of an antenna array.

The described arrangement is expensive and its constructive expenditures are high because of the necessity of using a plurality of shielded lines and because of the necessity of amplifying the signals received by the antenna array before the transmission to the receiver.

It therefore is an object of the present invention to provide a receiving arrangement that has a constructively simpler structure and can be produced in a more cost-effective manner.

This and other objects are achieved by a receiving arrangement of a motor vehicle having a first antenna array disposed at or on the body of the motor vehicle, and having a second antenna array disposed on a window pane of the motor vehicle, the antennas being coupled to a receiving unit for the further processing, particularly for the demodulation and/or decoding, of a respective received signal of the antennas. In this receiving arrangement, the receiving unit having a number of receivers is directly connected with the first and the second antenna array. During operation, the receiving unit causes a conversion of a respective received signal of the antennas to a respective loss-free transportable digital signal.

In the context of the present specification, a "direct connection" of the first or second antenna array with the receiving unit is a coaxial-cable-free connection or a connection without coaxial-cable plug-in connectors.

Furthermore, a direct connection means that the receiving unit with the number of receivers is arranged in the immediate spatial proximity of the first antenna array and of the second antenna array.

On the one hand, this arrangement makes it possible to do without the shielded lines. Shielded lines are required neither between the first and the second antenna array and the receiving unit, nor between the receiving unit and the control unit. As a result, the cabling of the receiving arrangement can have a simpler construction. The direct connection of the first and second antenna array to the receiving unit of the receiving arrangement further permits the elimination of the antenna amplifiers customary in the state of the art. On the one hand, this reduces the system costs of the receiving arrangement. Furthermore, space and weight can be saved.

The receiving unit, which according to the invention is linked directly to the first and the second antenna array, comprises a signal converter which converts received HF signals to a digital loss-free and transportable signal. When the signals received from the first or the second antenna array are present in digital form, these can be transmitted in a loss-free manner by way of a single cable to the remotely arranged control unit of the receiving unit.

According to one embodiment, an analog high-frequency (HF) signal is transmitted during the operation by way of a direct connection between the first antenna array and the receiving unit, as well as the second antenna array and the receiving unit. As a result of the direct connection between the first antenna array and the receiving unit or the second antenna array and the receiving unit, it is not necessary to shield the direct connection and to provide a normally used coaxial cable. Because of the direct connection, lower losses will occur up to the conversion of the received signals in the receiving unit to digital signals. The antenna amplifiers normally provided in spatial proximity of the antennas are therefore also not required.

In a further aspect of the invention, the receiving unit is connected with the first antenna array by way of a first ribbon cable and with the second antenna array by way of a second ribbon cable. The use of ribbon cables for generating a direct connection has the advantage that correct impedance replica can be obtained by use of the ribbon cables.

In a further embodiment, the length of the direct connection between the first antenna array and the receiving unit amounts to less than 10 cm, preferably less than 5 cm. In an advantageous further development, the length of the direct connection between the second antenna array and the receiving unit amounts to less than 20 cm, preferably less than 10 cm.

In another alternative further development, the receiving unit is connected with the first antenna array by way of a first plug and with the second antenna array by way of a second plug. In this embodiment, the receiving unit is arranged in the motor vehicle in the area of the first and second antenna array such that a wireless connection to the antennas becomes possible.

For this purpose, it may be provided that the receiving unit and the first antenna array are arranged on the roof of the body of the motor vehicle. It may further be provided that the plurality of receivers is arranged in a common housing, for example, on the roof of the motor vehicle.

According to a still further embodiment, the first and/or the second antenna array have several antennas for different receiving purposes, one receiver of the receiving unit being assigned to each antenna of the first and the second antenna array. In other words, the receiving unit has at least two receivers, one of the receivers being assigned to the first antenna array and the other being assigned to the second antenna array. Furthermore, the receiving unit may include additional receivers which are assigned to respective specific antennas of the first and second antenna array.

The first antenna array preferably has antennas for receiving radio services in the frequency range above 700 MHz (with a rod for receiving analog audio signals (FM/AM), also frequencies starting from 150 kHz), particularly for receiving digital audio signals (DAB), navigation data, and telephone. The second antenna array preferably has antennas for receiving radio services in the frequency range of between 150 kHz and 900 MHz, particularly for receiving analog audio signals (FM/AM) and video data (TV).

According to a further embodiment, the receiving unit and the control unit may be mutually connected by way of a bus, by which the respective digitized signal of the first and second antenna array can be transmitted. It is not relevant with respect to the invention on which technical principle the bus is based. Any known bus, for example, an Ethernet bus, can therefore be used.

According to a further suitable embodiment, the control unit is provided in a head unit of the motor vehicle. The components required for the demodulation and/or decoding may be combined in a central array (head unit) together with other communication and entertainment components or be provided in the receiving unit. In principle, it is also contemplated to arrange the individual elements of the receiving unit in different arrays. Thus, the demodulation (or decoding) could, for example, spatially already take place in the receiving unit. The further signal conversion could then be carried out after the transmission of the corresponding digital signals in a component arranged in the control unit or connected with the latter.

Because of the elimination of shielded high-frequency lines, the invention permits a simplification of the topology of a receiving arrangement for a motor vehicle. As a result, particularly significant cost reductions can be achieved.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
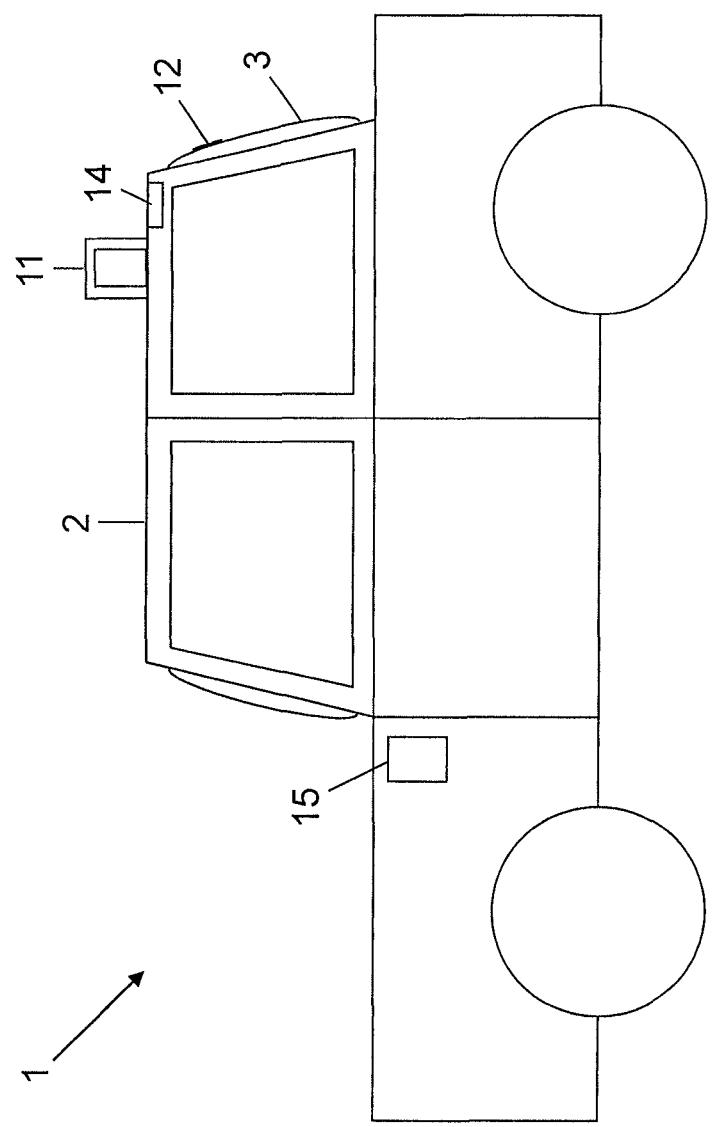
FIG. 1 is a schematic view of a motor vehicle with a receiving arrangement according to an embodiment of the invention.

FIG. 1 is a schematic illustration of a motor vehicle 1. A first antenna array 11 is arranged on a roof 2 of the body of the motor vehicle 1. The first antenna array 11 is constructed, for example, in the shape of a fin on the roof 2. A second antenna array 12 is provided, for example, on a rear window 3. In a fashion known to a person skilled in the art, the antennas of the second antenna array 12 are applied to the rear window 3 as thin wires that are difficult to recognize. As an alternative, the second antenna array 12 could also be arranged on one or more other windows of the motor vehicle 1.

The first, as well as the second, antenna array 11,12 may have several antennas for different receiving purposes. Typically, the first antenna array 11 includes all antennas for receiving short-wave radio services. Short-wave radio services are radio services in the frequency range above 700 MHz. This frequency range is used particularly for receiving digital audio signals (satellite radio or DAB), for the transmission of navigation signals (for example, GPS signals), as well as for the transmission of telephone signals. Sometimes, the first antenna array 11 also has an antenna for receiving analog audio signals in the FM or AM band. In this case, the frequency range already starts at 150 kHz. The received signals obtained in this case, together with analog audio signals also received by the second antenna array, are used for so-called diversity applications in order to improve the reception of analog audio signals. Typically, the second antenna array 12, which is also called a window antenna, includes antennas for receiving long-wave radio services. Such radio services are typically used in a frequency range between 150 kHz and 900 MHz. This particularly is the reception of audio signals as well as video data for TV applications.

In order to be able to eliminate the use of shielded high-frequency signal lines within the receiving arrangement, according to an embodiment of the invention, a receiving unit 14 is arranged in direct spatial proximity of the first and the second antenna array 11, 12. It is an object of the receiving unit 14 to convert the received HF signals to a digital loss-free transportable signal. The receiving unit 14 has at least one receiver for the first antenna array and at least one receiver for the second antenna array 12. The receiving unit 14 of the receiving arrangement preferably has one respectively assigned receiver for each antenna of the first antenna array array 11 and each antenna of the second antenna array array 12.

The receiving unit 14 is arranged on the vehicle body or generally inside the vehicle such that the length of the direct connection between the first antenna array 11 and the receiving unit 14 amounts to less than 10 cm, preferably even less than 5 cm. The length of the direct connection between the second antenna array and the receiving unit preferably amounts to less than 20 cm, preferably less than 10 cm. In order to be able to meet this requirement for avoiding shielded high-frequency cable lines, the receiving unit 14 is preferably arranged on the roof 2 of the body of the motor vehicle or even inside the fin of the first antenna array 11.

The signal transmission of the HF receiving signals from the first antenna array 11 and the second antenna array 12 to a signal conversion unit of the receiving unit 14 optionally takes place by way of ribbon cables or only one plug-in connection. The use of ribbon cables of the above-indicated length has the advantage of a correct matching of HF line impedances.

In addition to the receiving unit 14, the receiving arrangement 13 includes a control or signal processing unit 15. The signal processing unit is primarily used for the operation and display of the digital signals provided by the receiving unit. A decoding/demodulation of the received HF signals may optionally take place in the control unit 15 or in the receiving unit 14, depending on where the components required for this purpose are provided. The control unit 15 is preferably arranged in a known manner in the so-called head unit of the motor vehicle, which is typically situated in the area of the instrument panel. The head unit is a main unit of an infotainment system containing all components necessary for the operation and display. The data transmission preferably takes place by way of a bus connection 18.

Figure 2:
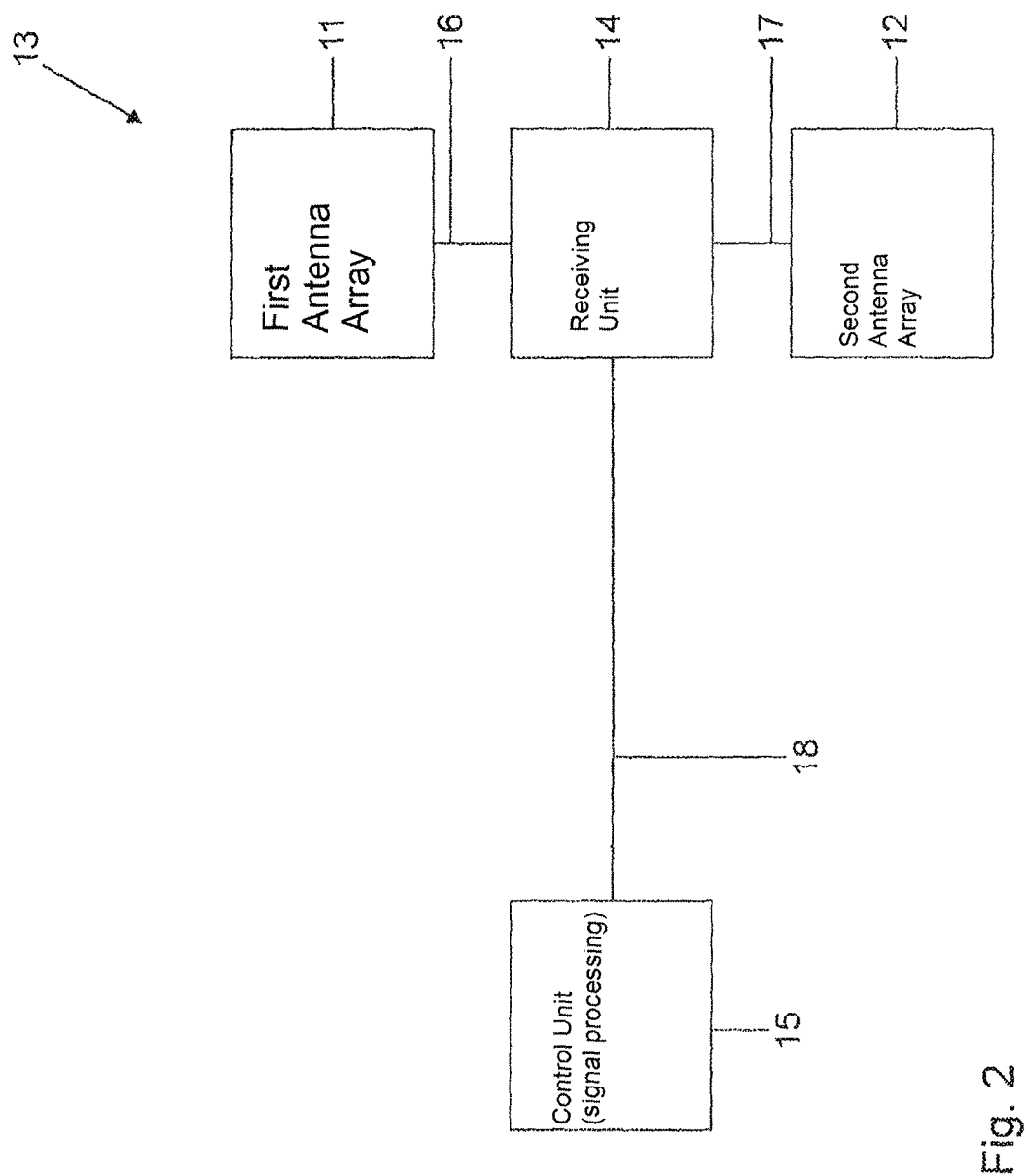
FIG. 2 is a schematic view of the components provided in a receiving arrangement according to an embodiment of the invention.

In a further schematic representation, FIG. 2 illustrates the above-described components of the receiving device according to an embodiment of the invention and their electric wiring. In this case, reference numbers 16 and 17 identify the direct connections between the first antenna array 11 and the receiving unit 14 as well as of the second antenna array 12 and the receiving unit 14. As described above, the direct connections preferably are ribbon cables or plugs, in which case, shielded HF lines can be eliminated because of the short distances to be bridged between the first antenna array 11 or the second antenna array 12 and the receiving unit 14. As also explained above, however, the use of ribbon cables permits the correct matching of impedances.

Since a conversion of received HF signals to digital signals takes place in the receiving unit 14, these can also be transmitted by way of greater line lengths via the bus 18 to the control unit 15 for further processing. The bus can be technically implemented in any arbitrary manner. It can, for example, be constructed as an Ethernet or as an optical waveguide.

The arrangement of a joint receiving unit for two spatially separate antenna arrays in direct proximity of the antenna arrays in the motor vehicle, permits the elimination of antenna amplifiers as well as of shielded signal lines.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement of a motor vehicle, comprising:
   a first antenna array disposed on a body of the motor vehicle;
   a second antenna array disposed on a window pane of the motor vehicle;
   a receiving unit having a number of receivers, the receiving unit being arranged in a defined spatial proximity relative to the first array and the second array such that respective received signals from the first array and the second array are not amplified before reaching the receiving unit and the receiving unit being directly connected with the first array and the second array without using a shielded cable line and, wherein during operation, the receiving unit causing a conversion of the respective received signals of the first array and the second array to respective loss-free transportable digital signals; and
   a control unit operatively coupled to receive the respective loss-free transportable digital signals for processing.

2. The arrangement according to claim 1, wherein the respective received signals of the first and second antenna arrays are further processed via at least one of demodulation and decoding of the respective received signal.

3. The arrangement according to claim 1, wherein an analog high-frequency signal is transmitted during the operation via a direct connection.

4. The arrangement according to claim 1, wherein the receiving unit is directly connected with the first antenna array by a first ribbon cable and with the second antenna array by a second ribbon cable.

5. The arrangement according to claim 1, wherein a length of the direct connection between the first antenna array and the receiving unit is less than 10 cm.

6. The arrangement according to claim 4, wherein a length of the direct connection between the first antenna array and the receiving unit is less than 10 cm.

7. The arrangement according to claim 4, wherein a length of the direct connection between the first antenna array and the receiving unit is less than 5 cm.

8. The arrangement according to claim 1, wherein a length of the direct connection between the second antenna array and the receiving unit amounts to less than 20 cm.

9. The arrangement according to claim 4, wherein a length of the direct connection between the second antenna array and the receiving unit amounts to less than 20 cm.

10. The arrangement according to claim 4, wherein a length of the direction between the second antenna array and the receiving unit is less than 10 cm.

11. The arrangement according to claim 1, wherein the receiving unit is directly connected with the first antenna array by a first plug and with the second antenna array by a second plug.

12. The arrangement according to claim 1, wherein the receiving unit and the first antenna array are arranged on a roof of the body of the motor vehicle.

13. The arrangement according to claim 1, wherein the number of receivers of the receiving unit is arranged in a common housing for the receiving unit.

14. The arrangement according to claim 1, wherein at least one of the first and second antenna arrays have several antennas for different receiving purposes, one receiver of the receiving unit being assigned to a respective antenna.

15. The arrangement according to claim 1, wherein the first antenna array comprises antennas for receiving radio services in a frequency range above 700 MHz.

16. The arrangement according to claim 1, wherein the first antenna array has antennas for receiving digital audio signals, navigation data, telephone signals, and optionally an antenna for receiving analog audio signals for antenna diversity applications in a frequency range above 150 kHz.

17. The arrangement according to claim 16, wherein the second antenna array comprises antennas for receiving long-wave radio services in a frequency range of between 150 kHz and 900 MHz, including FM/AM signals and TV signals.

18. The arrangement according to claim 1, further comprising a bus operatively coupling the receiving unit and the control unit, the respective loss-free transportable digital signals being transmitted via the bus.

19. The arrangement according to claim 1, further comprising a head unit operatively arranged in the motor vehicle, the head unit including the control unit.

20. The arrangement according to claim 2, wherein said at least of the demodulation and the decoding is carried out in the control unit or the receiving unit.

* * * * *